United States Patent
Ito et al.

(10) Patent No.: US 8,509,460 B2
(45) Date of Patent: *Aug. 13, 2013

(54) SOUND MIXING APPARATUS AND METHOD AND MULTIPOINT CONFERENCE SERVER

(75) Inventors: Hironori Ito, Tokyo (JP); Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 568 days.

This patent is subject to a terminal disclaimer.

(21) Appl. No.: 12/811,119

(22) PCT Filed: Jan. 28, 2009

(86) PCT No.: PCT/JP2009/051301
§ 371 (c)(1),
(2), (4) Date: Jun. 29, 2010

(87) PCT Pub. No.: WO2009/098974
PCT Pub. Date: Aug. 13, 2009

(65) Prior Publication Data
US 2010/0296675 A1    Nov. 25, 2010

(30) Foreign Application Priority Data
Feb. 4, 2008  (JP) ................................. 2008-023977

(51) Int. Cl.
*H04B 1/00*    (2006.01)
(52) U.S. Cl.
USPC ............................................ 381/119; 700/94
(58) Field of Classification Search
None
See application file for complete search history.

(56) References Cited

U.S. PATENT DOCUMENTS

| | | | | |
|---|---|---|---|---|
| 5,991,277 A | * | 11/1999 | Maeng et al. | 370/263 |
| 6,369,846 B1 | * | 4/2002 | Katsumi | 348/14.01 |
| 2002/0085697 A1 | | 7/2002 | Simard et al. | |
| 2003/0021429 A1 | * | 1/2003 | Ratcliff et al. | 381/119 |
| 2006/0049968 A1 | * | 3/2006 | Mukai | 341/50 |

FOREIGN PATENT DOCUMENTS

| | | |
|---|---|---|
| CN | 1987999 A | 6/2007 |
| EP | 0605960 A | 7/1994 |
| EP | 1432220 A | 6/2004 |
| JP | 63-314946 A | 12/1988 |
| JP | 9-321783 A | 12/1997 |
| JP | 70-75310 A | 3/1998 |
| JP | 10-233840 A | 9/1998 |

(Continued)

OTHER PUBLICATIONS

Supplementay European Search Report for EP 09 70 9365 issued Dec. 8, 2011.

(Continued)

*Primary Examiner* — Duc Nguyen
*Assistant Examiner* — Taunya McCarty (57) ABSTRACT

A sound mixing apparatus includes mixing processing units $1_1$ to $1_k$ provided according to sampling frequencies and speaker detector 400 that selects at least one speaker sound signal out of plural sound signals inputted to mixing processing units $1_1$ to $1_k$. Each of mixing processing units $1_1$ to $1_k$ adds up speaker sound signals having the same sampling frequency selected by speaker detector 400 to generate a first added-up sound signal, converts the sampling frequency of the first added-up sound signal into a sampling frequency processable by the other mixing processing units, and further adds up the first added-up sound signal and the first added-up sound signal converted into a sampling frequency processable by the processing unit and supplied from the other mixing processing units.

16 Claims, 3 Drawing Sheets

(56) References Cited

FOREIGN PATENT DOCUMENTS

| | | |
|---|---|---|
| JP | 11-213558 A | 8/1999 |
| JP | 2000069179 A | 3/2000 |
| JP | 2000175170 A | 6/2000 |
| JP | 2004517368 A | 6/2004 |
| JP | 2005020639 A | 1/2005 |
| JP | 2005229259 A | 8/2005 |
| JP | 2006080629 A | 3/2006 |

OTHER PUBLICATIONS

Y. M. Cheng et al., "Statistical recovery of wideband speech from narrowband speech", IEEE Transactions on Speech and Audio Processing, vol. 2, No. 4, Oct. 1, 1994, XP000874178, pp. 544-548.
International Search Report for PCT/JP2009/051301 mailed Mar. 3, 2009.
Chinese Office Action for CN200980102939.6 dated Jul. 30, 2012.

* cited by examiner

SOUND MIXING APPARATUS AND METHOD AND MULTIPOINT CONFERENCE SERVER

This application is the National Phase of PCT/JP2009/051301, filed Jan. 28, 2009, which is based upon and claims the benefit of priority from Japanese Patent Application No. 2008-23977 filed in Japan Patent Office on Feb. 4, 2008, the contents of which are hereby incorporated by reference.

TECHNICAL FIELD

The present invention relates to a technique for mixing plural sound signals, and, more particularly to a mixing technique for sound signals used in a server or the like that provides a multipoint conference service.

BACKGROUND ART

As a system that provides a multipoint conference service, there is a multipoint teleconference system disclosed in Japanese Patent Laid-Open No. 2000-175170. This multipoint teleconference system includes plural conference terminals and a multipoint control apparatus to which these conference terminals are connected. The conference terminals are allocated to participants.

In this multipoint teleconference system, the respective conference terminals transmit acoustic signals concerning sound detected by the conference terminals to the multipoint control apparatus. The multipoint control apparatus adds up the acoustic signals received from the respective conference terminals. For each of the conference terminals, the multipoint control apparatus subtracts the acoustic signal, which is received from the conference terminal, from the added-up acoustic signal, encodes an acoustic signal obtained as a result of the subtraction, and transmits the encoded acoustic signal to the conference terminal.

The multipoint control apparatus can be applied to various communication networks such as a line switching network, a mobile network, and a packet network. In the line switching network, communication protocols specified by H.323 and H.324 of the ITU-T (Telecommunication Union Telecommunication Standardization Sector) recommendation are used. In the mobile network, a communication protocol specified by 3G-324M is used. In the packet network based on the IP (Internet Protocol), RFC3550RTP of the IETF (The Internet Engineering Task Force) is used. "RFC" is an abbreviation of "Request for Comments" and "RTP" is an abbreviation of "Real-time Transport Protocol".

As the multipoint control apparatus, there are a multipoint control apparatus that is mounted with a sound encoder for telephone band sound and a multipoint control apparatus mounted with a sound encoder for wideband sound. The sound encoder for telephone band sound has a sampling frequency of 8 kHz and that employs a 3.4 kHz band to transmit a sound signal. The sound encoder for wideband sound has a sampling frequency of 16 kHz and employs a 7 kHz band to transmit a sound signal. As a sound encoder for telephone band sound, a sound encoder of an AMR (Adaptive Multi-Rate) system adopted in G.711, G.729, and 3GPP of the ITU-T recommendation, a sound encoder of an EVRC (Enhanced Variable Rate Codec) system adopted in 3GPP2 of the ITU-T recommendation, and the like are used. As a sound encoder for wideband sound, a sound encoder of an AMR-WB (Wide Band) system specified by G.722 and 3GPP TS26.190 of the ITU-T recommendation is used. It is possible to handle sound signals in a wider band by using the codec of an MPEG-4AAC (Advanced Audio Coding) or the like.

DISCLOSURE OF THE INVENTION

When convenience in using the multipoint conference service is taken into account, it is desirable that the multipoint conference service is provided among terminals that transmit and receive sound (acoustic) signals in different bands such as a terminal that uses a telephone band and a terminal that uses a wideband. However, the multipoint control apparatus explained above only handles sound signals in a single band such as sound signals for telephone band sound or wideband sound. Therefore, it is difficult to provide a multipoint conference service among terminals that transmit and receive sound signals in different bands.

The multipoint control apparatus explained above is configured to subtract, for each of the conference terminals, an acoustic signal, which is received from the conference terminal, from an added-up acoustic signal, and encode an acoustic signal obtained as a result of the subtraction. In such a configuration for performing encoding for each of participants, when a system in which a large number of participants hold a multipoint conference is established, there is a deficiency in that the amount that needs to be calculated for encoding is enormous and a long time is required for arithmetic processing.

It is an exemplary object of the present invention to solve the problems explained above and to provide a sound mixing apparatus, a sound mixing method, and a multipoint conference server that can mix sound signals in plural bands having different sampling frequencies and can suppress an increase in the amount that needs to be calculated.

A sound mixing apparatus according to an exemplary aspect of the present invention includes: plural mixing processing units provided according to sampling frequencies; and a speaker detector that selects at least one speaker sound signal including a sound utterance of a speaker from among plural sound signals inputted to the plural mixing processing units, wherein each processing unit of the plural mixing processing units adds up speaker sound signals selected by the speaker detector from among sound signals having a same sampling frequency inputted to the processing unit to generate a first added-up sound signal, converts the sampling frequency of the first added-up sound signal into a sampling frequency processable by the other mixing processing units, supplies the first added-up sound signals that are converted to the sampling frequency, to the other mixing processing units, and adds up, to generate a second added-up sound signal, the first added-up sound signal generated by itself and the first added-up sound signals that are converted to a sampling frequency processable by itself and that are supplied from the other mixing processing units.

A sound mixing method according to an exemplary aspect of the present invention is a sound mixing method for mixing plural sound signals having different sampling frequencies, the sound mixing method including:

a first step of selecting at least one speaker sound signal including a sound utterance of a speaker from among the plural sound signals;

a second step of adding up, for each of the groups formed by classifying the plural sound signals according to sampling frequencies, speaker sound signals having the same sampling frequency, which are selected in the first step, to generate a first added-up sound signal, converting the sampling frequency of the first added-up sound signal into a sampling frequency processable in the other groups, and allocating sound signals that are converted to the sampling frequency, to the other groups; and a third step of adding up, for each group, the first added-up sound signal that is generated in said each group and the first added-up sound signals, that are allocated from the other groups to said each group and that are converted to the sampling frequency, to generate a second added-up sound signal.

A multipoint conference server according to an exemplary aspect of the present invention is a multipoint conference server connected to plural communication terminals via a network, the multipoint conference server including:

a signal classifier that classifies, according to sampling frequencies, plural sound signals received from the plural communication terminals;

plural mixing processing units that are provided according to sampling frequencies and mix sound signals having a same sampling frequency supplied from the signal classifier; and a speaker detector that selects at least one speaker sound signal including a sound utterance of a speaker from among plural sound signals inputted to the plural mixing processing units, wherein each processing unit of the plural mixing processing units adds up speaker sound signals selected by the speaker detector from among sound signals having the same sampling frequency inputted to the processing unit to generate a first added-up sound signal, converts the sampling frequency of the first added-up sound signal into a sampling frequency processable by the other mixing processing units, supplies the first added-up sound signals that are converted to the sampling frequency, to the other mixing processing units, and adds up, to generate a second added-up sound signal, the first added-up sound signal generated by itself and the first added-up sound signals that are converted to a sampling frequency processable by itself and that are supplied from the other mixing processing units.

DESCRIPTION OF REFERENCE NUMERALS $1_1$-$1_k$ Mixing processing unit
400 Speaker detector
$10_1$-$10_n$, $20_1$-$20_n$, $30_1$-$30_n$ Sound-signal input terminal
$11_1$-$11_n$, $21_1$-$21_n$, $31_1$-$31_n$ Power calculator
$12_1$-$12_n$, $22_1$-$22_n$, $32_1$-$32_n$ Sound signal switching unit
$13_1$-$13_k$ Group signal adder
$14_1$-$14_{k-1}$, $12_1$-$12_{k-1}$, $13_1$-$13_{k-1}$ Sampling converter
$15_1$-$15_k$ All-signal adder
$16_1$-$16_n$, $26_1$-$26_n$, $36_1$-$36_n$ Signal subtracter
$17_1$-$17_n$, $27_1$-$27_n$, $37_1$-$37_n$ Encoder
$40_1$-$40_k$ Common encoder
$18_1$-$18_n$, $28_1$-$28_n$, $38_1$-$38_n$ Sound-signal switching unit
$19_1$-$19_n$, $29_1$-$29_n$, $39_1$-$39_n$ Sound-signal output terminal

BEST MODE FOR CARRYING OUT THE INVENTION

Next, an exemplary embodiment of the present invention will be described in detail with reference to the drawings.

Figure 1:
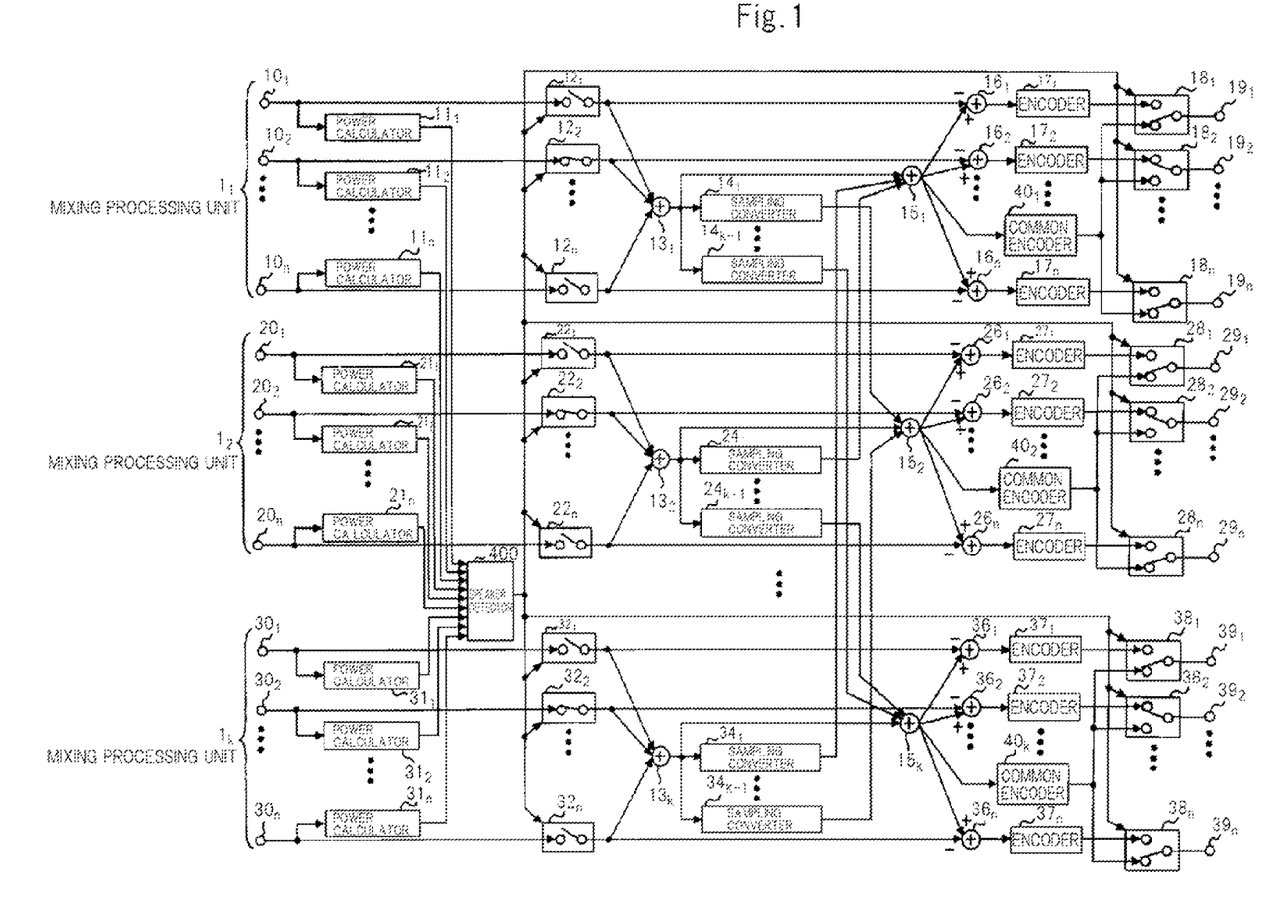
FIG. 1 is a block diagram of a configuration of a sound mixing apparatus according to an exemplary embodiment.

FIG. 1 is a block diagram of a configuration of a sound mixing apparatus according to an exemplary embodiment of the present invention.

The sound mixing apparatus shown in FIG. 1 is mounted on a multipoint conference server, which is a multipoint control apparatus, and has k mixing processing units $1_1$ to $1_k$ and speaker detector 400. The multipoint conference server is allowed to receive sound signals in plural bands having different sampling frequencies. The mixing processing units are provided for the respective bands. The number of mixing processing units $1_1$ to $1_k$ corresponds to a maximum number of bands that can be handled by the multipoint conference server. The multipoint conference server is configured to receive sound signals in k different bands $B_1$ to $B_k$. The received sound signals are supplied to mixing processing units $1_1$ to $1_k$ provided according to bands.

Before explaining a detailed configuration of the sound mixing apparatus according to this exemplary embodiment, a configuration of the multipoint conference server mounted with the sound mixing apparatus according to this exemplary embodiment will be briefly explained.

Figure 2:
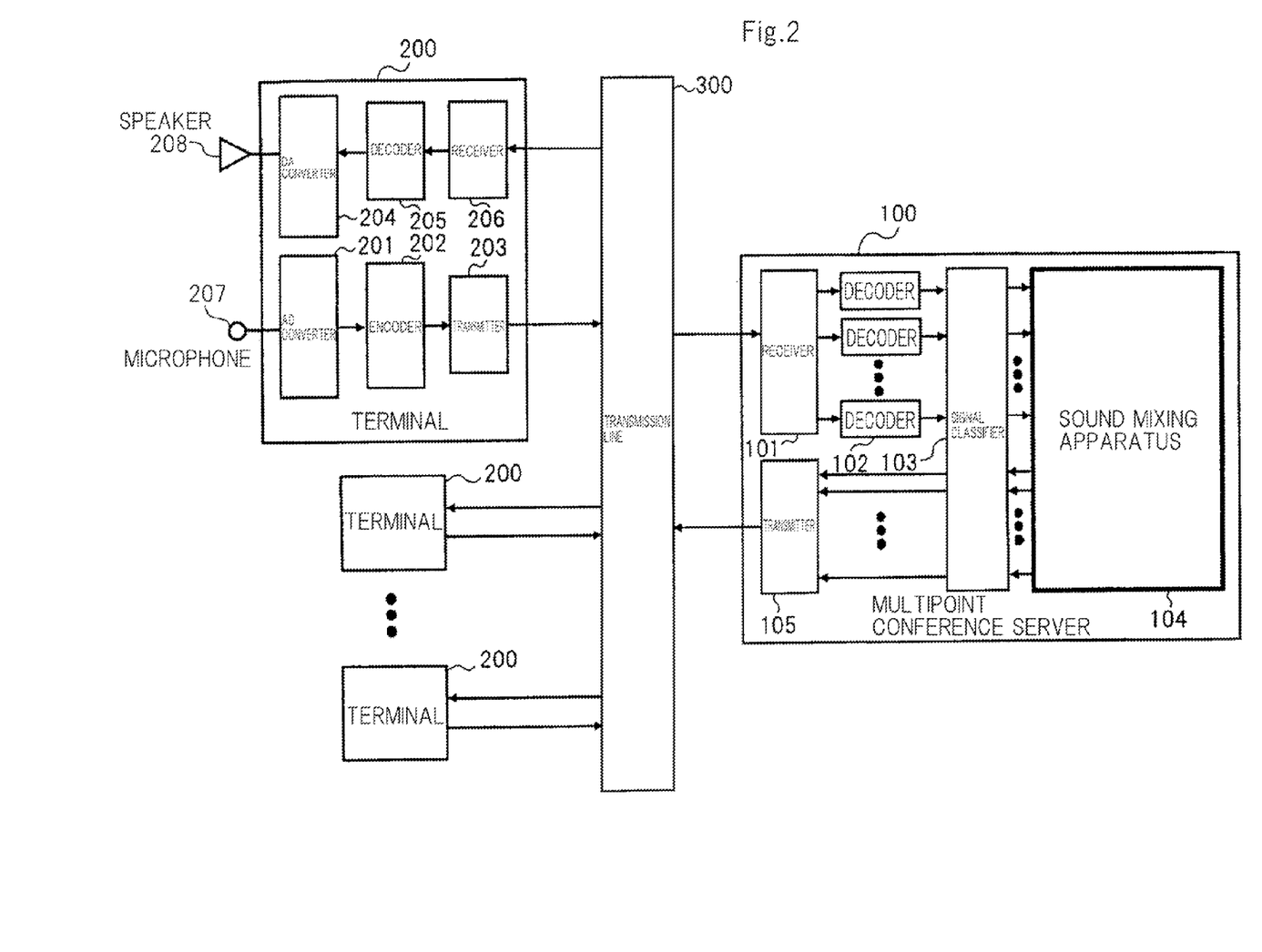
FIG. 2 is a block diagram of a configuration of a multipoint conference system that uses a multipoint conference server mounted with the mixing apparatus shown in FIG. 1.

FIG. 2 is a block diagram of a configuration of a multipoint conference system that uses the multipoint conference server mounted with the sound mixing apparatus shown in FIG. 1. This multipoint conference system includes plural terminals 200 and multipoint conference server 100 to which these terminals 200 are connected via transmission line 300.

Transmission line 300 includes plural communication networks such as a line switching network, a mobile network, and a packet network. When sound signals are transmitted and received between terminals 200 and multipoint conference server 100, call connection information of the sound signals (including address information concerning the terminals that transmit the sound signals, information concerning bands, and information concerning sampling frequencies) is supplied to multipoint conference server 100 through protocols of the respective communication networks.

Plural terminals 200 include plural terminals having different bands and sampling frequencies of sound signals transmitted and received via transmission line 300. For example, a terminal for telephone band sound, that has a sampling frequency of 8 kHz and employs a 3.4 kHz band to transmit a sound signal, and a terminal for wideband sound, that has a sampling frequency of 16 kHz and employs a 7 kHz band to transmit a sound signal, are used as terminals 200. Configurations of terminals 200 are basically the same.

Each of terminals 200 includes AD converter 201, encoder 202, transmitter 203, DA converter 204, decoder 205, and receiver 206.

AD converter 201 converts a sound signal (an analog signal) from microphone 207 into a digital signal. Encoder 202 encodes the sound signal (the digital signal) supplied from AD converter 201. Transmitter 203 transmits the encoded sound signal, which is supplied from encoder 202, to multipoint conference server 100 via transmission line 300.

Receiver 206 receives the encoded sound signal (the digital signal) from multipoint conference server 100 via transmission line 300. Decoder 205 decodes the encoded sound signal supplied from receiver 206. DA converter 204 converts the decoded sound signal (the digital signal) from decoder 205 into an analog signal. The sound signal converted into the analog signal is supplied from DA converter 204 to speaker 208.

Multipoint conference server 100 includes receiver 101, plural decoders 102, signal classifier 103, sound mixing apparatus 104, and transmitter 105. Sound mixing apparatus 104 is the sound mixing apparatus shown in FIG. 1.

Receiver 101 receives a sound signal from each of terminals 200 via transmission line 300. The received sound signal is supplied from receiver 101 to any one of plural decoders 102. Decoder 102 decodes the sound signal supplied from receiver 101. The decoded sound signal is supplied from decoder 102 to signal classifier 103.

Signal classifier 103 supplies, according to the sampling frequency of the decoded sound signal supplied from decoder 102, the decoded sound signal to a mixing processing unit corresponding to the decoded sound signal among mixing processing units $1_1$ to $1_k$ shown in FIG. 1. Signal classifier 103 supplies the sound signal, which is supplied from sound mixing apparatus 104, to transmitter 105. The sampling frequency of the decoded sound signal can be obtained from call control information obtained when receiver 101 receives the sound signal.

Transmitter 105 transmits the sound signal, which is supplied from signal classifier 103, to a terminal corresponding to the sound signal among plural terminals 200 via transmission line 300. A terminal, as a transmission destination, can be identified on the basis of call control information obtained when receiver 101 receives the sound signal.

Sound mixing apparatus 104 mixes and encodes plural sound signals classified according to sampling frequencies, which are supplied from signal classifier 103, and supplies the encoded sound signals to signal classifier 103.

A configuration of sound mixing apparatus 104 is specifically explained with reference to FIG. 1.

Sound mixing apparatus 104 includes speaker detector 400 and mixing processing units $1_1$ to $1_k$. Mixing processing units $1_1$ to $1_k$ basically have the same configuration. For convenience of explanation, specific configurations concerning mixing processing unit mixing processing unit $1_2$, and mixing processing unit $1_k$ are shown in FIG. 1.

[Configuration of Mixing Processing Unit $1_1$]

Mixing processing unit $1_1$ includes sound-signal input terminals $10_1$ to $10_n$, power calculators $11_1$ to $11_n$, sound-signal switching units $12_1$ to $12_n$, group signal adder $13_1$, sampling converters $14_1$ to $14_{k-1}$, all-signal adder $15_1$, signal subtracters $16_1$ to $16_n$, encoders $17_1$ to $17_n$, common encoder $40_1$, sound-signal switching units $18_1$ to $18_n$, and sound-signal output terminals $19_1$ to $19_n$.

Sound signals in band $B_1$ are allocated and supplied to sound-signal input terminals $10_1$ to $10_n$. For example, when n sound signals are received as sound signals in band $B_1$, the received sound signals are supplied to each of sound-signal input terminals $10_1$ to $10_n$.

Sound-signal input terminal $10_1$ is connected to an input terminal of power calculator $11_1$ and connected to an input terminal of sound-signal switching unit $12_1$. Similarly, sound-signal input terminals $10_2$ to $10_n$ are connected to input terminals of power calculators $11_2$ to $11_n$ and connected to input terminals of sound-signal switching units $12_2$ to $12_n$.

Power calculator $11_1$ calculates the power of an input sound signal supplied from sound-signal input terminal $10_1$. For example, when a sampling frequency of an input sound signal S(n) is 8 kHz, power calculator $11_1$ calculates, at every 20 milliseconds (160 samples), power of the input sound signal S(n) according to Formula (1).

[Formula 1]

$$P = \sum_{n=0}^{L-1} \sqrt{S^2(n)} / L \qquad \text{Formula (1)}$$

where, L=160.

In the same manner as the power calculation preformed by power calculator $11_1$, power calculators $11_2$ to $11_n$ calculate the power of input sound signals supplied from sound-signal input terminals $10_2$ to $10_n$. Power calculation values of power calculators $11_1$ to $11_n$ are supplied to speaker detector 400.

Sound-signal switching units $12_1$ to $12_n$ are configured to be turned on and off according to a control signal from speaker detector 400. Only when sound-signal switching units $12_1$ to $12_n$ are turned on, are sound signals inputted thereto outputted.

An output of sound-signal switching unit $12_1$ is supplied to group signal adder $13_1$ and signal subtracter $16_1$. Similarly, outputs of sound-signal switching units $12_2$ to $12_n$ are supplied to group signal adder $13_1$ and supplied to signal subtracters $16_2$ to $16_n$.

Group signal adder $13_1$ adds up the sound signals from sound-signal switching units $12_1$ to $12_n$ and outputs the result of the addition. The output of group signal adder $13_1$ is supplied to sampling converters $14_1$ to $14_{k-1}$ and all-signal adder $15_1$.

Sampling converters $14_1$ to $14_{k-1}$ are provided in association with the other bands $B_2$ to $B_k$ excluding band $B_1$. Sampling converter $14_1$ converts a sampling frequency of a sound signal (the addition result) supplied from group signal adder $13_1$ such that the sampling frequency coincides with the sampling frequency of a sound signal in band $B_2$. For example, when a sampling frequency of the sound signal in band $B_1$ is 8 kHz and a sampling frequency of the sound signal in band $B_2$ is 16 kHz, sampling converter $14_1$ converts the sampling frequency of the sound signal from group signal adder $13_1$ from 8 kHz to 16 kHz. Similarly, sampling converters $14_2$ to $14_{k-1}$ convert the sampling frequency of the sound signal from group signal adder $13_1$ into a sampling frequency of a sound signal in a band corresponding to the sound signal.

An output of sampling converter $14_1$ is supplied to the all-signal adder of mixing processing unit $1_2$ corresponding to band $B_2$. Similarly, outputs of sampling converters $14_2$ to $14_{k-1}$ are supplied to the all-signal adders of mixing processing units $1_3$ to $1_k$ corresponding to bands $B_3$ to $B_k$.

All-signal adder $15_1$ receives the sound signal from group signal adder $13_1$ and sound signals from the group signal adders of the other mixing processing units $1_2$ to $1_k$ as inputs and adds up these input sound signals. An output of all-signal adder $15_1$ is supplied to signal subtracters $16_1$ to $16_n$ and common encoder $40_1$.

Signal subtracter $16_1$ receives a sound signal from sound-signal switching unit $12_1$ as a first input, receives a sound signal from all-signal adder $15_1$ as a second input, and outputs a sound signal obtained by subtracting the first input from the second input. The output of signal subtracter $16_1$ is supplied to encoder $17_1$. Similarly, each of signal subtracters $16_2$ to $16_n$ receives a sound signal from a sound-signal switching unit corresponding thereto among sound-signal switching units $12_2$ to $12_n$ as a first input, receives a sound signal from all-signal adder $15_1$ as a second input, and outputs a sound signal obtained by subtracting the first input from the second input.

Outputs from signal subtracters $16_2$ to $16_n$ are supplied to encoders $17_2$ to $17_n$. Signal subtracters $16_1$ to $16_n$ do not output sound signals when a sound signal is not supplied as the first input (when sound-signal switching units $12_1$ to $12_n$ are off).

Encoder $17_1$ encodes a sound signal from signal subtracter $16_1$. An output of encoder $17_1$ is supplied to sound-signal switching unit $18_1$. Similarly, encoders $17_2$ to $17_n$ encode sound signals from signal subtracters corresponding thereto among signal subtracters $16_2$ to $16_n$. Outputs of encoders $17_2$ to $17_n$ are supplied to sound-signal switching units $18_2$ to $18_n$.

Common encoder $40_1$ encodes a sound signal from all-signal adder $15_1$. An output of common encoder $40_1$ is supplied to sound-signal switching units $18_1$ to $18_n$.

Sound-signal switching unit $18_1$ receives the encoded sound signal from encoder $17_1$ as a first input, receives the encoded sound signal from common encoder $40_1$ as a second input, and selects and outputs any one of the first and second inputs according to a control signal from speaker detector 400. The output of sound-signal switching unit $18_1$ is supplied to sound-signal output terminal $19_1$. Similarly, each of sound-signal switching units $18_2$ to $18_n$ receives the encoded sound signal from the encoder corresponding thereto among encoders $17_2$ to $17_n$ as a first input, receives the encoded sound signal from common encoder $40_1$ as a second input, and selects and outputs any one of the first and second inputs according to a control signal from speaker detector 400. Outputs of sound-signal switching units $18_2$ to $18_n$ are supplied to sound-signal output terminals $19_2$ to $19_n$.

Sound-signal output terminals $19_1$ to $19_n$ supply the inputted sound signals to signal classifier 103 shown in FIG. 2.

[Configuration of Mixing Processing Unit $1_2$]

Mixing processing unit $1_2$ includes sound-signal input terminals $20_1$ to $20_n$, power calculators $21_1$ to $21_n$, sound-signal switching units $22_1$ to $22_n$, group signal adder $13_2$, sampling converters $24_1$ to $24_{k-1}$, all-signal adder $15_2$, signal subtracters $26_1$ to $26_n$, encoders $27_1$ to $27_n$, common encoder $40_2$, sound-signal switching units $28_1$ to $28_n$, and sound-signal output terminals $29_1$ to $29_n$.

Sound signals in band $B_2$ are allocated and supplied to sound-signal input terminals $20_1$ to $20_n$. The number of sound-signal input terminals $20_1$ to $20_n$ may be the same as or different from the number of sound-signal input terminals of the other mixing processing units.

Sound-signal input terminal $20_1$ is connected to an input terminal of power calculator $21_1$ and is connected to an input terminal of sound-signal switching unit $22_1$. Similarly, sound-signal input terminals $20_2$ to $20_n$ are connected to input terminals of power calculators $21_2$ to $21_n$ and are connected to input terminals of sound-signal switching units $22_2$ to $22_n$.

Power calculator $21_1$ calculates the power of an input sound signal supplied from sound-signal input terminal $20_1$. This power calculation is the same as the power calculation preformed by power calculator $11_1$. Similarly, power calculators $21_2$ to $21_n$ calculate the power of input sound signals supplied from sound-signal input terminals $20_2$ to $20_n$. Power calculation values of power calculators $21_1$ to $21_n$ are supplied to speaker detector 400.

Sound-signal switching units $22_1$ to $22_n$ are configured to be turned on and off according to a control signal from speaker detector 400. Only when sound-signal switching units $22_1$ to $22_n$ are turned on, are sound signals inputted thereto outputted.

An output of sound-signal switching unit $22_1$ is supplied to group signal adder $13_2$ and signal subtracter $26_1$. Similarly, outputs of sound-signal switching units $22_2$ to $22_n$ are supplied to group signal adder $13_2$ and are supplied to signal subtracters $26_2$ to $26_n$.

Group signal adder $13_2$ adds up the sound signals from sound-signal switching units $22_1$ to $22_n$ and outputs the result of the addition. The output of group signal adder $13_2$ is supplied to sampling converters $24_1$ to $24_{k-1}$ and all-signal adder $15_2$.

Sampling converters $24_1$ to $24_{k-1}$ are provided in association with the other bands $B_1$ and $B_3$ to $B_k$ excluding band $B_2$. Sampling converter $24_1$ converts the sampling frequency of a sound signal (the addition result) supplied from group signal adder $13_2$ such that the sampling frequency coincides with a sampling frequency of the sound signal in band $B_1$. Similarly, sampling converters $24_2$ to $24_{k-1}$ convert the sampling frequency of the sound signal from group signal adder $13_2$ into a sampling frequency of a sound signal in a band corresponding to the sound signal.

An output of sampling converter $24_1$ is supplied to the all-signal adder of mixing processing unit $1_1$ corresponding to band $B_1$. Similarly, outputs of sampling converters $24_2$ to $24_{k-1}$ are supplied to the all-signal adders of mixing processing units $1_3$ to $1_k$ corresponding to bands $B_3$ to $B_k$.

All-signal adder $15_2$ receives a sound signal from group signal adder $13_2$ and sound signals from the group signal adders of the other mixing processing units $1_1$ and $1_3$ to $1_k$ as inputs and adds up these input sound signals. An output of all-signal adder $15_2$ is supplied to signal subtracters $26_1$ to $26_n$ and common encoder $40_2$.

Signal subtracter $26_1$ receives a sound signal from sound-signal switching unit $22_1$ as a first input, receives a sound signal from all-signal adder $15_2$ as a second input, and outputs a sound signal obtained by subtracting the first input from the second input. The output of signal subtracter $26_1$ is supplied to encoder $27_1$. Similarly, each of signal subtracters $26_2$ to $26_n$ receives a sound signal from a sound-signal switching unit corresponding thereto among sound-signal switching units $22_2$ to $22_n$ as a first input, and receives a sound signal from all-signal adder $15_2$ as a second input, and outputs a sound signal obtained by subtracting the first input from the second input. Outputs of signal subtracters $26_2$ to $26_n$ are supplied to encoders $27_2$ to $27_n$.

Encoder $27_1$ encodes the sound signal from signal subtracter $26_1$. An output of encoder $27_1$ is supplied to sound-signal switching unit $28_1$. Similarly, encoders $27_2$ to $27_n$ encode sound signals from the signal subtracters corresponding thereto among signal subtracters $26_2$ to $26_n$. Outputs of encoders $27_2$ to $27_n$ are supplied to sound-signal switching units $28_2$ to $28_n$.

Common encoder $40_2$ encodes a sound signal from all-signal adder $15_2$. An output of common encoder $40_2$ is supplied to sound-signal switching units $28_1$ to $28_n$.

Sound-signal switching unit $28_1$ receives the encoded sound signal from encoder $27_1$ as a first input, receives the encoded sound signal from common encoder $40_2$ as a second input, and selects and outputs any one of the first and second inputs according to a control signal from speaker detector 400. The output of sound-signal switching unit $28_1$ is supplied to sound-signal output terminal $29_1$. Similarly, each of sound-signal switching units $28_2$ to $28_n$ receives the encoded sound signal from the encoder corresponding thereto among encoders $27_2$ to $27_n$ as a first input, receives the encoded sound signal from common encoder $40_2$ as a second input, and selects and outputs any one of the first and second inputs according to a control signal from speaker detector 400. Outputs of sound-signal switching units $28_2$ to $28_n$ are supplied to sound-signal output terminals $29_2$ to $29_n$.

Sound-signal output terminals $29_1$ to $29_n$ supply the inputted sound signals to signal classifier 103 shown in FIG. 2.

[Configuration of Mixing Processing Unit $1_k$]

Mixing processing unit $1_k$ includes sound-signal input terminals $30_1$ to $30_n$, power calculators $31_1$ to $31_n$, sound-signal switching units $32_1$ to $32_n$, group signal adder $13_k$, sampling converters $34_1$ to $34_{k-1}$, all-signal adder $15_k$, signal subtracters $36_1$ to $36_n$, encoders $37_1$ to $37_n$, common encoder $40_k$, sound-signal switching units $38_1$ to $38_n$, and sound-signal output terminals $39_1$ to $39_n$.

Sound signals in band $B_k$ are allocated and supplied to sound-signal input terminals $30_1$ to $30_n$. The number of sound-signal input terminals $30_1$ to $30_n$ may be the same as or different from the number of sound-signal input terminals of the other mixing processing units.

Sound-signal input terminal $30_1$ is connected to an input terminal of power calculator $31_1$ and is connected to an input terminal of sound-signal switching unit $32_1$. Similarly, sound-signal input terminals $30_2$ to $30_n$ are connected to input terminals of power calculators $31_2$ to $31_n$ and are connected to input terminals of sound-signal switching units $32_2$ to $32_n$.

Power calculator $31_1$ calculates the power of an input sound signal supplied from sound-signal input terminal $30_1$. This power calculation is the same as the power calculation by power calculator $11_1$. Similarly, power calculators $31_2$ to $31_n$ calculate the power of input sound signals supplied from sound-signal input terminals $30_2$ to $30_n$. Power calculation values of power calculators $31_1$ to $31_n$ are supplied to speaker detector 400.

Sound-signal switching units $32_1$ to $32_n$ are configured to be turned on and off according to a control signal from speaker detector 400. Only when sound-signal switching units $32_1$ to $32_n$ are turned on, are sound signals inputted thereto outputted.

An output of sound-signal switching unit $32_1$ is supplied to group signal adder $13_k$ and signal subtracter $36_1$. Similarly, outputs of sound-signal switching units $32_2$ to $32_n$ are supplied to group signal adder $13_k$ and supplied to signal subtracters $36_2$ to $36_n$.

Group signal adder $13_k$ adds up the sound signals from sound-signal switching units $32_1$ to $32_n$ and outputs the result of the addition. The output of group signal adder $13_k$ is supplied to sampling converters $34_1$ to $34_{k-1}$ and all-signal adder $15_k$.

Sampling converters $34_1$ to $34_{k-1}$ are provided in association with the other bands $B_1$ to $B_{k-1}$ excluding band $B_k$. Sampling converter $34_1$ converts the sampling frequency of a sound signal (the addition result) supplied from group signal adder $13_k$ such that the sampling frequency coincides with a sampling frequency of the sound signal in band $B_1$. Similarly, sampling converters $34_2$ to $34_{k-1}$ convert the sampling frequency of the sound signal from group signal adder $13_k$ into a sampling frequency of a sound signal in a band corresponding to the sound signal.

An output of sampling converter $34_1$ is supplied to the all-signal adder of mixing processing unit $1_1$ corresponding to band $B_1$. Similarly, outputs of sampling converters $34_2$ to $34_{k-1}$ are supplied to the all-signal adders of mixing processing units $1_2$ to $1_{k-1}$ corresponding to bands $B_2$ to $B_{k-1}$.

All-signal adder $15_k$ receives a sound signal from group signal adder $13_k$ and receives sound signals from the group signal adders of the other mixing processing units $1_1$ to $1_{k-1}$ as inputs and adds up these input sound signals. An output of all-signal adder $15_k$ is supplied to signal subtracters $36_1$ to $36_n$ and common encoder $40k$.

Signal subtracter $36_1$ receives a sound signal from sound-signal switching unit $32_1$ as a first input, receives a sound signal from all-signal adder $15_k$ as a second input, and outputs a sound signal obtained by subtracting the first input from the second input. The output of signal subtracter $36_1$ is supplied to encoder $37_1$. Similarly, each of signal subtracters $36_2$ to $36_n$ receives a sound signal from a sound-signal switching unit corresponding thereto among sound-signal switching units $32_2$ to $32_n$ as a first input, and receives a sound signal from all-signal adder $15_k$ as a second input, and outputs a sound signal obtained by subtracting the first input from the second input. Outputs of signal subtracters $36_2$ to $36_n$ are supplied to encoders $37_2$ to $37_n$.

Encoder $37_1$ encodes the sound signal from signal subtracter $36_1$. An output of encoder $37_1$ is supplied to sound-signal switching unit $38_1$. Similarly, encoders $37_2$ to $37_n$ encode sound signals from the signal subtracters corresponding thereto among signal subtracters $36_2$ to $36_n$. Outputs of encoders $37_2$ to $37_n$ are supplied to sound-signal switching units $38_2$ to $38_n$.

Common encoder $40_k$ encodes a sound signal from all-signal adder $15_k$. An output of common encoder $40_k$ is supplied to sound-signal switching units $38_1$ to $38_n$.

Sound-signal switching unit $38_1$ receives the encoded sound signal from encoder $37_1$ as a first input, receives the encoded sound signal from common encoder $40_k$ as a second input, and selects and outputs any one of the first and second inputs according to a control signal from speaker detector 400. The output of sound-signal switching unit $38_1$ is supplied to sound-signal output terminal $39_1$. Similarly, each of sound-signal switching units $38_2$ to $38_n$ receives the encoded sound signal from the encoder corresponding thereto among encoders $37_2$ to $37_n$ as a first input, receives the encoded sound signal from common encoder $40_k$ as a second input, and selects and outputs any one of the first and second inputs according to a control signal from speaker detector 400. Outputs of sound-signal switching units $38_2$ to $38_n$ are supplied to sound-signal output terminals $39_2$ to $39_n$.

Sound-signal output terminals $39_1$ to $39_n$ supplies the inputted sound signals to signal classifier 103 shown in FIG. 2.

Configurations of the other mixing processing units $1_3$ to $1_{k-1}$ are basically the same as those of mixing processing units $1_1$, $1_2$, and $1_k$ explained above.

Operations of the sound mixing apparatus according to this exemplary embodiment are explained in detail below.

Figure 3:
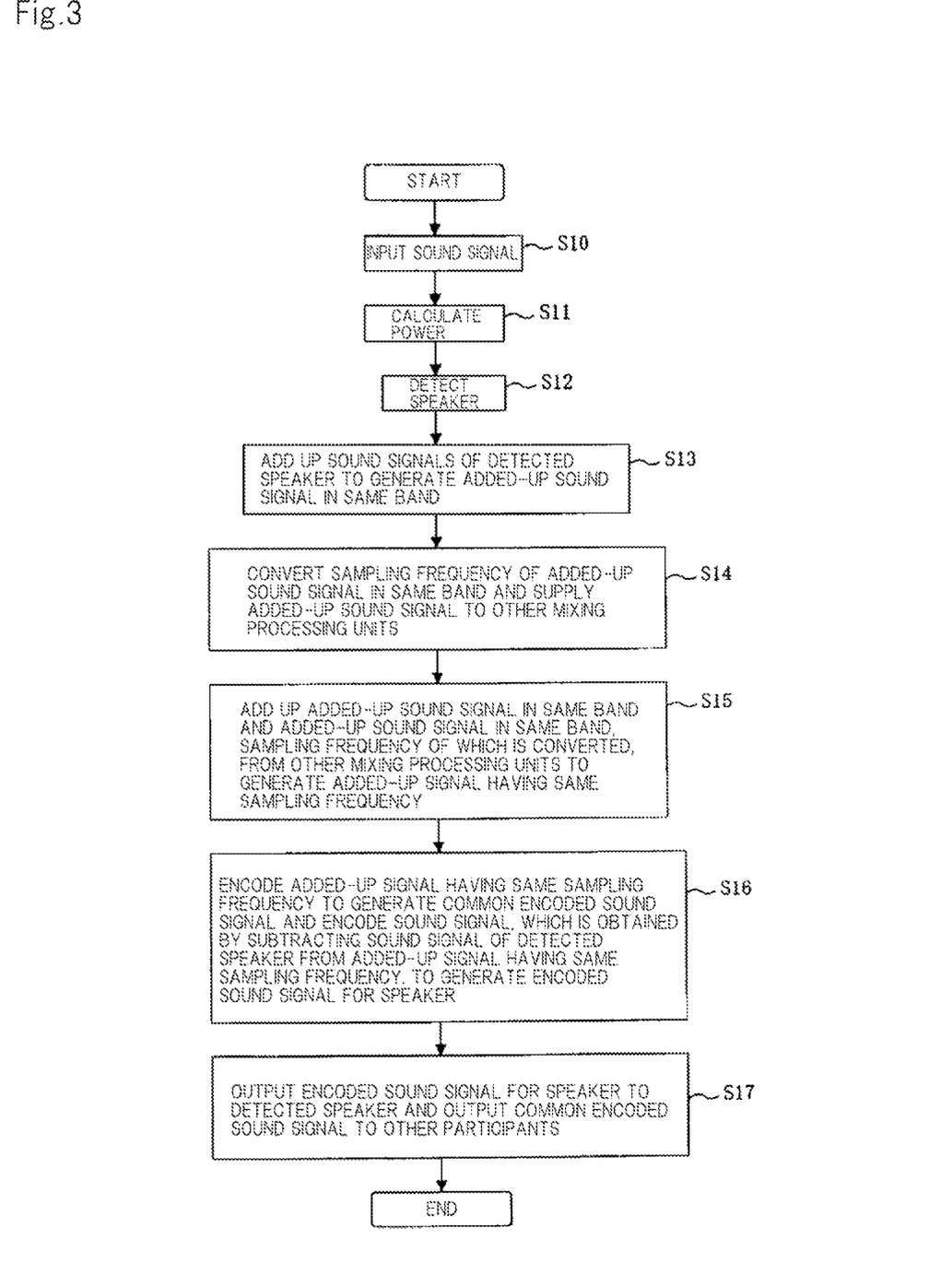
FIG. 3 is a flowchart of a procedure of mixing processing by the sound mixing apparatus shown in FIG. 1.

FIG. 3 is a flowchart of a procedure of a sound mixing process preformed by the sound mixing apparatus shown in FIG. 1.

Operations of mixing processing units $1_1$ to $1_k$ are basically the same. Operations of mixing processing unit $1_1$ and speaker detector 400 performed when signal classifier 103 shown in FIG. 2 supplies sound signals in bands $B_1$ to $B_k$ to mixing processing units $1_1$ to $1_k$ are explained with reference to FIGS. 1 and 3. Sampling frequencies of the sound signals in bands $B_1$ to $B_k$ are sampling frequencies $F_1$ to $F_k$, respectively.

As sound signals in bands $B_1$, plural sound signals $S_1$ to $S_n$ having sampling frequency $F_1$ are supplied to sound-signal input terminals $10_1$ to $10_n$ (step S10). Sound signal $S_1$ inputted to sound-signal input terminal $10_1$ is supplied to power calculator $11_1$ and sound-signal switching unit $12_1$. Similarly, sound signals $S_2$ to $S_n$ inputted to sound-signal input terminals $10_2$ to $10_n$ are supplied to power calculators $11_2$ to $11_n$ and supplied to sound-signal switching units $12_2$ to $12_n$.

Subsequently, power calculators $11_1$ to $11_n$ calculate the power of inputted sound signals and supply results of the calculation to speaker detector 400 (step S11). Speaker detector 400 selects, on the basis of the power calculation results from power calculators $11_1$ to $11_n$, sound signals including sound by utterances (speech signals of a speaker) from among sound signals $S_1$ to $S_n$ (step S12). Speaker detector 400 transmits a control signal based on a selection result of the sound signals of the speaker to sound-signal switching units $12_1$ to $12_n$ and sound-signal switching units $18_1$ to $18_n$.

In the selection of the sound signals of the speaker, speaker detector 400 may select, for example, m (1≦n<n) sound signals from among sound signals $S_1$ to $S_n$ in order from the one having the largest power value. Speaker detector 400 may determine not only the power of the sound signals but also the sound signals including the sound by utterances using information concerning VAD (Voice Activity Detection) obtained during sound decoding. When speakers (presenters) in a conference are limited, speaker detector 400 may select the sound signals of a speaker (a presenter) designated in advance. Speaker detector 400 may select sound signals whose signal levels (power values) are equal to or higher than a reference value.

After the selection of the sound signals of the speaker, group signal adder $13_1$ adds up the sound signals selected by speaker detector 400 and outputs an added-up sound signal in the same band (step S13). In this addition processing, speaker detector 400 supplies a control signal for turning on a switch to the sound-signal switching unit, to which the sound signals selected as the sound signals of the speaker is supplied, among sound-signal switching units $12_1$ to $12_n$. Speaker detector 400 supplies a control signal for turning off a switch to the other sound-signal switching units. Consequently, only the sound signals selected as the sound signals of the speaker are supplied to group signal adder $13_1$.

The added-up sound signal in the same band outputted from group signal adder $13_1$ is supplied to sampling converters $14_1$ to $14_{k-1}$ and all-signal adder $15_1$. Sampling converter $14_1$ converts sampling frequency $F_1$ of the added-up sound signal in the same band supplied from group signal adder $13_1$ into sampling frequency $F_2$. Similarly, sampling converters $14_2$ to $14_{k-1}$ convert sampling frequency $F_1$ of the added-up sound signal in the same band supplied from group signal adder $13_1$ into a corresponding sampling frequency among sampling frequencies $F_3$ to $F_k$. The added-up sound signals in the same band, whose sampling frequencies are converted to sampling frequencies in the other bands by sampling converters $14_1$ to $14_{k-1}$, are supplied to all-signal adders $15_2$ to $15_k$ of the other mixing processing units $1_2$ to $1_k$ (step S14).

All-signal adder $15_1$ adds up the added-up sound signal in the same band supplied from group signal adder $13_1$ and the other added-up sound signals in the same band, the sampling frequencies of which are converted, from the other mixing processing units $1_2$ to $1_k$ and outputs an added-up sound signal having the same sampling frequency $F_1$ (step S15). The added-up sound signal having the same sampling frequency $F_1$ outputted from all-signal adder $15_1$ is supplied to signal subtracters $16_1$ to $16_n$ and common encoder $40_1$.

Common encoder $40_1$ encodes the added-up sound signal having the same sampling frequency $F_1$ from all-signal adder $15_1$ and outputs a common encoded sound signal. The signal subtracter, to which the sound signals of the speaker selected by speaker detector 400 are supplied, from among signal subtracters $16_1$ to $16_n$, subtracts the supplied sound signals of the speaker from the added-up sound signal having the same sampling frequency $F_1$ from all-signal adder $15_1$ and outputs the result of the subtraction. The encoder, to which a sound signal obtained by subtracting the sound signals of the speaker from the added-up sound signal having the same sampling frequency $F_1$ is supplied, from among encoders $17_1$ to $17_n$, encodes the supplied sound signal and outputs an encoded sound signal for the speaker (step S16).

In the encoder, to which only the added-up sound signal having the same sampling frequency $F_1$ is supplied, from among encoders $17_1$ to $17_n$, the encoding operation is not performed. The control operation in the encoder is realized by controlling ON and OFF of sound-signal switching units $12_1$ to $12_n$ by speaker detector 400. Instead, speaker detector 400 may directly control encoders $17_1$ to $17_n$. For example, speaker detector 400 may transmit a control signal, that indicates that the encoding operation should stop, to the encoder connected to the turned-off sound-signal switching unit and the encoder may stop the encoding operation on the basis of the control signal from speaker detector 400.

Finally, the sound-signal switching unit, to which the encoded sound signal for the speaker is supplied, from among sound-signal switching units $18_1$ to $18_n$ outputs the supplied encoded sound signal for the speaker according to the control signal from speaker detector 400. The other sound-signal switching units output a common encoded sound signal from common encoder $40_1$ (step S17).

In the other mixing processing units $1_2$ to $1_k$, sound mixing processing is performed in the same procedure as steps S10 to S17.

Operations of the respective mixing processing units of the sound mixing apparatus according to this exemplary embodiment are explained with reference to specific numerical values of sampling frequencies.

Plural terminals 200 shown in FIG. 2 include a first terminal group that transmits and receives a sound signal having a sampling frequency of 8 kHz (e.g., sound data of the G.729 system and the AMR system), a second terminal group that transmits and receives a sound signal having a sampling frequency of 16 kHz (e.g., sound data of the G.722 system and the AMR-WB system), and a third terminal group that transmits and receives a sound signal having a sampling frequency of 32 kHz (e.g., sound data of the AAC system).

The sound signal from the first terminal group is supplied to mixing processing unit $1_1$, the sound signal from the second terminal group is supplied to mixing processing unit $1_2$, and the sound signal from the third terminal group is supplied to mixing processing unit $1_3$.

In mixing processing unit $1_1$, according to the procedure shown in FIG. 3, a mixing process is performed for the sound signal obtained from the first terminal group. In this mixing process, sampling converter $14_1$ converts a sampling frequency of 8 kHz of an added-up sound signal in the same band from group signal adder $13_1$ into a sampling frequency of 16 kHz processable by mixing processing unit $1_2$.

In up-sampling conversion from the sampling frequency of 8 kHz to the sampling frequency of 16 kHz, for example, one sample having a value 0 is inserted between samples of the sound signal having the frequency of 8 kHz, whereby a sound signal having a double number of samples is generated. The generated sound signal is passed through a band limiting filter that only allows bands equally to or lower than a frequency of 4 kHz to pass through, whereby a sound signal having the sampling frequency of 16 kHz is obtained.

Sampling converter $14_2$ converts the sampling frequency of 8 kHz of the added-up sound signal in the same band from group signal adder $13_1$ into a sampling frequency of 32 kHz processable by mixing processing unit $1_3$.

In up-sampling conversion from a sampling frequency of 8 kHz to a sampling frequency of 32 kHz, for example, three samples having a value 0 are inserted between samples of the sound signal having a frequency of 8 kHz, whereby a sound signal having a quadruple number of samples is generated.

The generated sound signal is passed through a band limiting filter that only allows bands equally to or lower than a frequency of 4 kHz to pass through, whereby a sound signal having a sampling frequency of 32 kHz is obtained.

Concerning details of the sampling conversion, for example, the document "J. O. Smith, "A Flexible Sampling-Rate Conversion Method," Proc. IEEEICASSP '84 Vol. 9, Part 1, pp. 112 to 115" can be referred to.

When up-sampling conversion is performed, in order to prevent a sense of hearing of discomfort caused by mixing sound signals in different bands, for example, band expansion processing for adding a pseudo signal to a high frequency may be applied. Concerning details of band expansion processing, for example, the document "Yan Ming Cheng, O'Shaughnessy and D. Mermelstein, "Statistical Recovery of Wideband Speech from Narrowband speech," Speech and Audio Processing, IEEE Transactions on Volume 2, Issue 4, October 1994 pp. 544 to 548" can be referred to.

In mixing processing unit $1_2$, mixing processing for the sound signal from the second terminal group is performed based on the procedure shown in FIG. 3. In this mixing processing, sampling converter $24_1$ converts a sampling frequency of 16 kHz of an added-up sound signal in the same band from group signal adder $13_2$ into a sampling frequency of 8 kHz processable by mixing processing unit $1_1$.

In down-sampling conversion from a sampling frequency of 16 kHz to a sampling frequency of 8 kHz, for example, after a sound signal having a sampling frequency of 16 kHz is passed through a band limiting filter that only allows bands equally to or lower than a frequency of 4 kHz to pass through, data of the sound signal is thinned out for every other sample, whereby a sound signal having the sampling frequency of 8 kHz is obtained.

Sampling converter $24_2$ converts a sampling frequency of 16 kHz of the added-up sound signal in the same band from group signal adder $13_2$ into a sampling frequency of 32 kHz processable by mixing processing unit $1_3$.

In up-sampling conversion from the sampling frequency of 16 kHz to the sampling frequency of 32 kHz, for example, one sample having a value 0 is inserted between samples of the sound signal having the frequency of 16 kHz, whereby a sound signal having a double number of samples is generated. The generated sound signal is passed through a band limiting filter that only allows bands equally to or lower than a frequency of 8 kHz to pass through, whereby a sound signal having the sampling frequency of 32 kHz is obtained.

In mixing processing unit $1_3$, a mixing process is performed for the sound signal obtained from the third terminal group according to the procedure shown in FIG. 3. In this mixing processing, sampling converter $34_1$ converts a sampling frequency of 32 kHz of an added-up sound signal in the same band from group signal adder $13_3$ into a sampling frequency of 8 kHz processable by mixing processing unit $1_1$.

In down-sampling conversion from a sampling frequency of 32 kHz to a sampling frequency of 8 kHz, for example, after a sound signal having a sampling frequency of 32 kHz is passed through a band limiting filter that only allows bands equal to or lower than a frequency of 4 kHz to pass through, data of the sound signal is thinned out for every three samples, whereby a sound signal having the sampling frequency of 8 kHz is obtained.

Sampling converter $34_2$ converts a sampling frequency of 32 kHz of the added-up sound signal in the same band from group signal adder $13_2$ into a sampling frequency of 16 kHz processable by mixing processing unit $1_2$.

In down-sampling conversion from a sampling frequency of 32 kHz to a sampling frequency of 16 kHz, for example, after a sound signal having a sampling frequency of 32 kHz is passed through a band limiting filter that only allows bands equally to or lower than a frequency of 8 kHz to pass through, data of the sound signal is thinned out for every other sample, whereby a sound signal having a sampling frequency of 16 kHz is obtained.

According to the conversion processing for a sampling frequency explained above, in each mixing processing unit provided according to bands, it is possible to perform mixing of a sound signal supplied to the processing unit and sound signals supplied to the other mixing processing units.

As explained above, in the sound mixing apparatus according to this exemplary embodiment, speaker detector 400 selects at least one sound signal (sound signal of the speaker) from the sound signals supplied to mixing processing units $1_1$ to $1_k$ provided according to bands. Each of mixing processing units $1_1$ to $1_k$ adds up the sound signals of the speaker selected by speaker detector 400 to generate an added-up sound signal in the same band and converts a sampling frequency of the added-up sound signal in the same band into a sampling frequency processable by the other mixing processing units. Further, each of mixing processing units $1_1$ to $1_k$ adds up the added-up sound signal in the same band, which is generated by the processing units, and the added-up sound signal in the same band, which is converted into a sampling frequency of the processing unit and which is supplied from the other mixing processing unit, to generate an added-up signal having the same sampling frequency. Each of mixing processing units $1_1$ to $1_k$ subtracts only the selected sound signal of the speaker from the added-up signal having the same sampling frequency and encodes a sound signal obtained as a result of the subtraction. Such encoding processing is performed in the sound mixing apparatus. For participants other than the speaker, a sound signal obtained by encoding the added-up signal having the same sampling frequency using the common encoder is used.

According to the configuration explained above, each of mixing processing units $1_1$ to $1_k$ converts a sampling frequency of an added-up sound signal in the same band into a sampling frequency processable by the other mixing processing units, and each mixing processing unit adds up an added-up sound signal in the same band, which is generated by the processing unit, and added-up sound signals in the same band, which is converted into a sampling frequency of the processing unit and which is supplied from the other mixing processing unit, whereby mixing sound signals in plural different bands can be mixed. In this way, it is possible to perform sound mixing in which sound signals in plural bands having different sampling frequencies are mixed. Therefore, for example, it is possible to provide a multipoint conference service between terminals that transmit and receive sound (acoustic) signals in different bands such as a terminal that uses a telephone band and a terminal that uses a wideband. Consequently, it is possible to realize improved convenience in the multipoint sound conference service.

An arithmetic processing for encoding is individually applied to only the selected sound signals of the speaker and an arithmetic result obtained by using the common encoder is used in common for participants other than the speaker. Therefore, since it is unnecessary to individually apply arithmetic processing to participants other than the speaker using the encoders, it is possible to reduce the amount of arithmetic processing that is required for encoding. In this way, encoding is applied to the speaker speech signals selected from among the plural sound signals to limit the number of sound signals to be mixed. Therefore, it is possible to prevent an arithmetic amount by sound encoding from increasing according to an increase in participants. However, the number of sound signals to be individually encoded depends on the number of sound signals selected by the speaker detector.

The sound mixing apparatus according to this exemplary embodiment is an example of the present invention. It is possible to appropriately change a configuration and operations thereof without departing from the spirit of the present invention.

For example, when each of mixing processing units $1_1$ to $1_k$ adds up the added-up sound signal in the same band generated by the processing unit and the added-up sound signal in the same band converted into the sampling frequency of the processing unit and supplied from the other mixing processing units, the processing unit may add a pseudo sound signal having a high-frequency component decided in advance to the added up signal. This makes it possible to prevent, when the up-sampling conversion is performed, a sense of hearing discomfort caused by mixing sound signals in different bands and to improve the sound quality of a signal having a low sampling frequency.

In the speaker selecting operation by speaker detector 400, if a state in which a sound signal in a high-frequency band is selected and a state in which such a sound signal is not selected at all are repeated, a sound signal including a high-frequency component and a sound signal not including a high-frequency component are repeatedly outputted as mixed sound signals. Such sound signals cause a sense of hearing discomfort in a listener. To prevent this problem, speaker detector 400 may select, for each of bands (groups), at least one sound signal as a sound signal of the speaker. Speaker detector 400 may select, for a band having the highest sampling frequency, at least one sound signal as a sound signal of the speaker.

In the sound mixing apparatus shown in FIG. 1, mixing processing units $1_1$ to $1_k$ may use, as output signals thereof, sound signals outputted from all-signal adders $15_1$ to $15_k$ or sound data obtained by encoding the output sound signals.

In the sound mixing apparatus shown in FIG. 1, the encoders (e.g., common encoders $40_1$ to $40_k$ and encoders $17_1$ to $17_k$, $27_1$ to $27_k$, and $37_1$ to $37_k$) of mixing processing units $1_1$ to $1_k$ may be prediction encoders.

The prediction encoders calculate, for example, when sound signals are input in frame units, a linear prediction coefficient from the sound signals of frames in the past and perform encoding of sound signals in present frames using the linear prediction coefficient. In mixing processing units $1_1$ to $1_k$, switching is performed between the common encoder and the encoders. Therefore, when switching is performed, if a liner prediction coefficient of the common encoder and a liner prediction coefficient of the encoders are different, the sound quality is deteriorated.

To prevent the problem, when the common encoder is switched to the encoders, speaker detector 400 instructs the common encoder to supply the linear prediction coefficient of the common encoder to the encoders to which the common encoder has been switched. According to this instruction, the common encoder supplies the linear prediction coefficient of the common encoder to the encoders to which the common encoder is switched. According to this control, when the common encoder has been switched to the encoders, the linear prediction coefficient of the common encoder and the linear prediction coefficient of the encoders to which the common encoder has been switched can be set the same.

When the encoders are switched to the common encoder, the liner prediction coefficient is not supplied from the encoders to the common encoder. In this case, the linear prediction coefficient of the common encoder is different from the liner prediction coefficient of the encoders. However, the influence on sound quality due to the inconsistency of liner prediction coefficients is small. A reason for this is explained below with reference to an example in which the encoders mix a sound signal from terminal T of participant A with sound signals of terminals of a plurality other participants.

When participant A utters a word, the state of determination by the speaker detector is changed from determination that a sound signal from terminal T is not a signal of the speaker to determination that the sound signal from terminal T is a signal of the speaker. As a result, switching from the common encoder to the encoders is performed. After switching, the encoders start processing of prediction encoding for signals obtained by subtracting the sound signal from terminal T of the participant from sound signals from all-signal adders. However, at the start of the processing, the encoders do not have a liner prediction coefficient necessary for the prediction encoding. The liner prediction coefficient necessary for prediction encoding in this case is a liner prediction coefficient for the sound signals from all-signal adders. The liner prediction coefficient is stored in the common encoder. Therefore, since the common encoder supplies the liner prediction coefficient of the common encoder to the encoders, the encoders can highly accurately execute the prediction encoding processing.

On the other hand, when participant A stops the utterance, the state of determination by the speaker detector is changed from determination that the sound signal from terminal T is a signal of the speaker to the determination that the sound signal from terminal T is not a signal of the speaker. As a result, switching from the encoders to the common encoder is performed. After the switching, the sound signal encoded by the common encoder is transmitted to terminal T. In this case, the common encoder continues, in prior to switching, prediction encoding processing for the sound signals from all-signal adders. Therefore, the common encoder has a liner prediction coefficient necessary for prediction encoding after switching. This liner prediction coefficient of the common encoder is close to the liner prediction coefficient of the encoders at the time when participant A's utterances stop. Therefore, when switching from the encoders to the common encoder is performed, the common encoder can highly accurately execute the prediction encoding process using the liner prediction coefficient of the common encoder.

In the configuration shown in FIGS. 1 and 2, the decoders and the signal classifiers may be provided in the sound mixing apparatus or may be provided in the receiver.

The multipoint conference server shown in FIG. 2 can be realized by a computer system that operates according to a program. A main part of this computer system includes a storage device that accumulates programs, data, and the like, input devices such as a keyboard and a mouse, a display device such as an LCD (Liquid Crystal Display), a communication device such as a modem that communicates with the outside, an output device such as a printer, and a control device (CPU: Central Processing Unit) that operates according to the programs stored in the storage device, receives an input from the input device, and controls operations of the communication device, the output device, and the display device. As an application program, a program for causing the CPU to execute the mixing processing shown in FIG. 3 is stored in the storage device. This program may be provided through a recording medium or the Internet. As an application program, a program for causing a DSP (Digital Signal Processor) to execute the mixing processing shown in FIG. 3 can also be provided.

The present invention can be applied to apparatuses in general that perform sound mixing besides the system that provides the multipoint conference service. For example, the present invention can be applied to a system that provides various media services. The system is realized by an MRF (Media Resource Function) specified by 3GPP and an MRCF (Media Resource Control Function) corresponding to the call control unit. The MRF and the MRCF are used for realizing a function of a so-called multipoint control apparatus (MCU: Multi-Point Control Unit) of the multipoint conference system.

Although the present invention has been described with reference to an exemplary embodiment, the present invention is not limited to the above-described exemplary embodiment. The configuration and operation of the present invention is open to various modifications within a scope that does not depart from the spirit of the present invention that will be understood by one of ordinary skill in the art.

This application is based upon and claims the benefit of priority from Japanese Patent Application No. 2008-23977 filed in Japan Patent Office on Feb. 4, 2008, the contents of which are hereby incorporated by reference.

The invention claimed is:

1. A sound mixing apparatus comprising:
   plural mixing processing units provided according to sampling frequencies; and
   a speaker detector that selects at least one speaker sound signal including a sound utterance of a speaker from among plural sound signals inputted to the plural mixing processing units, wherein
   each processing unit of the plural mixing processing units adds up speaker sound signals selected by the speaker detector from among sound signals having a same sampling frequency inputted to the processing unit to generate a first added-up sound signal, converts the sampling frequency of the first added-up sound signal into a sampling frequency processable by the other mixing processing units, supplies the first added-up sound signals that are converted to the sampling frequency, to the other mixing processing units, and adds up, to generate a second added-up sound signal, the first added-up sound signal generated by itself and the first added-up sound signals that are converted to a sampling frequency processable by itself and that are supplied from the other mixing processing units wherein each of the plural mixing processing units generates, for each of the speaker sound signals selected by the speaker detector, a subtracted sound signal obtained by subtracting the speaker sound signal from the second added-up sound signal and encodes the subtracted sound signal.

2. The sound mixing apparatus according to claim 1, wherein each of the plural mixing processing units encodes the second added-up sound signal instead of encoding each of the sound signals other than the speaker sound signal from among the sound signals having the same sampling frequency inputted to the processing unit.

3. The sound mixing apparatus according to claim 1, wherein the speaker detector selects a sound signal, a signal level of which is equal to or higher than a reference value, as the speaker sound signal.

4. The sound mixing apparatus according to claim 1, wherein the speaker detector selects a sound signal concerning a speaker designated in advance from among the plural sound signals inputted to the plural mixing processing units.

5. The sound mixing apparatus according to claim 1, wherein each of the plural mixing processing units adds a pseudo sound signal having a high-frequency component decided in advance to the second added-up sound signal.

6. The sound mixing apparatus according to claim 1, wherein the speaker detector selects, in each of the plural mixing processing units, an input signal having a highest sampling frequency from among the inputted sound signals.

7. The sound mixing apparatus according to claim 1, wherein each of the plural mixing processing units includes:
   a group signal adder that adds up speaker sound signals selected by the speaker detector to generate the first added-up sound signal;
   an all-signal adder that adds up the first added-up sound signal generated by the group signal adder and the first added-up sound signal converted into a sampling frequency processable by the processing unit and supplied from the other mixing processing units to generate the second added-up sound signal;
   plural signal subtracters that are provided for each of the input sound signals having the same sampling frequency, receive supply of the input sound signal as a first input, receive supply of the second added-up sound signal, which is generated by the all-signal adder, as a second input, and subtract the first input from the second input;
   plural encoders that respectively encode sound signals outputted from the plural signal subtracters; and
   a common encoder that encodes the second added-up sound signal generated by the all-signal adder, wherein
   for the speaker sound signal selected by the speaker detector, encoding by the encoder corresponding to the speaker sound signal from among the plural encoders is performed and, for the sound signals other than the speaker sound signal, encoding by the common encoder is performed.

8. The sound mixing apparatus according to claim 7, wherein
   the common encoder stores information for performing prediction encoding of the second added-up sound signal, and
   each of the plural encoders performs, when the common encoder is switched to the encoder, prediction encoding of the speaker sound signal with reference to the information stored in the common encoder.

9. A sound mixing method for mixing plural sound signals having different sampling frequencies, the sound mixing method comprising:
   selecting at least one speaker sound signal including a sound utterance of a speaker from among the plural sound signals;
   adding up, for each of the groups formed by classifying the plural sound signals according to sampling frequencies, speaker sound signals having the same sampling frequency, which are selected in the step when selecting said at least one speaker sound signal, to generate a first added-up sound signal, converting the sampling frequency of the first added-up sound signal into a sampling frequency processable in the other groups, and allocating sound signals that are converted to the sampling frequency, to the other groups;
   adding up, for each group, the first added-up sound signal that is generated in said each group and the first added-up sound signals, that are allocated from the other groups to said each group and that are converted to the sampling frequency, to generate a second added-up sound signal subtracting, in each of the groups, each of the speaker signals, which is selected in the step when selecting said at least one speaker sound signal, from the second added-up sound signal to generate a subtracted sound signal, and encoding the subtracted sound signal.

10. The sound mixing method according to claim 9, further comprising using in common, in said each group, a sound signal obtained by encoding the second added-up sound signal as a sound signal other than the speaker sound signal, which is selected from among sound signals of the same sampling frequency, in the step when selecting said at least one speaker sound signal.

11. The sound mixing method according to claim 10, wherein
the common encoding step when using in common the encoded sound signal includes storing information for performing prediction encoding of the second added-up sound signal, and
the sound mixing method further includes performing, when the step when encoding the subtracted sound signal is performed instead of the common encoding step, prediction encoding of the speaker sound signal with reference to said information stored in the common encoding step.

12. The sound mixing method according to claim 9, wherein the step when selecting said at least one speaker sound signal includes selecting a sound signal, a signal level of which is equal to or higher than a reference value, as the speaker sound signal from among the plural sound signals.

13. The sound mixing method according to claim 9, wherein the step when selecting said at least one speaker sound signal includes selecting a sound signal of a speaker designated in advance from among the plural sound signals as the speaker sound signal.

14. The sound mixing method according to claim 9, further comprising adding, in each of the groups, a pseudo sound signal having a high-frequency component decided in advance to the second added-up sound signal.

15. The sound mixing method according to claim 9, wherein the step when selecting said at least one speaker sound signal includes selecting at least a sound signal having a highest sampling frequency from among the plural sound signals.

16. A multipoint conference server connected to plural communication terminals via a network, the multipoint conference server comprising:
a signal classifier that classifies, according to sampling frequencies, plural sound signals received from the plural communication terminals;
plural mixing processing units that are provided according to sampling frequencies and mix sound signals having a same sampling frequency supplied from the signal classifier; and
a speaker detector that selects at least one speaker sound signal including a sound utterance of a speaker from among plural sound signals inputted to the plural mixing processing units, wherein
each processing unit of the plural mixing processing units adds up speaker sound signals selected by the speaker detector from among sound signals having the same sampling frequency inputted to the processing unit to generate a first added-up sound signal, converts the sampling frequency of the first added-up sound signal into a sampling frequency processable by the other mixing processing units, supplies the first added-up sound signals that are converted to the sampling frequency, to the other mixing processing units, and adds up, to generate a second added-up sound signal, the first added-up sound signal generated by itself and the first added-up sound signals that are converted to a sampling frequency processable by itself and that are supplied from the other mixing processing units wherein each of the plural mixing processing units generates, for each of the speaker sound signals selected by the speaker detector, a subtracted sound signal obtained by subtracting the speaker sound signal from the second added-up sound signal and encodes the subtracted sound signal.

* * * * *